(12) United States Patent
Schaar

(10) Patent No.: US 10,283,297 B2
(45) Date of Patent: May 7, 2019

(54) SWITCHING DEVICE FOR A WYE-DELTA SWITCH IN A MULTIPHASE MOTOR

(71) Applicant: Eaton Electrical IP GmbH & Co. KG, Schoenefeld (DE)

(72) Inventor: Ingo Schaar, Bonn (DE)

(73) Assignee: EATON INTELLIGENT POWER LIMITED, Dublin (IE)

( * ) Notice: Subject to any disclaimer, the term of this patent is extended or adjusted under 35 U.S.C. 154(b) by 379 days.

(21) Appl. No.: 15/303,740

(22) PCT Filed: Feb. 27, 2015

(86) PCT No.: PCT/EP2015/054154
§ 371 (c)(1),
(2) Date: Oct. 13, 2016

(87) PCT Pub. No.: WO2015/158457
PCT Pub. Date: Oct. 22, 2015

(65) Prior Publication Data
US 2017/0032916 A1    Feb. 2, 2017

(30) Foreign Application Priority Data

Apr. 17, 2014    (DE) .................. 10 2014 105 579

(51) Int. Cl.
*H02P 1/26*    (2006.01)
*H01H 50/00*    (2006.01)
(Continued)

(52) U.S. Cl.
CPC ........ *H01H 50/002* (2013.01); *H01H 50/546* (2013.01); *H01H 51/2209* (2013.01);
(Continued)

(58) Field of Classification Search
CPC ... H01H 50/02; H01H 50/546; H01H 51/2209
(Continued)

(56) References Cited

U.S. PATENT DOCUMENTS 3,624,471 A * 11/1971 Japp ..................... H02P 1/32
                                                                318/771
4,736,147 A *  4/1988 Shizhang ............. H02P 1/46
                                                                318/737
(Continued)

FOREIGN PATENT DOCUMENTS

DE          744556 C     11/1944
DE          864711 C      1/1953
(Continued)

*Primary Examiner* — Robert W Horn
(74) *Attorney, Agent, or Firm* — Leydig, Voit & Mayer, Ltd.

(57) ABSTRACT

A switching device, for a wye-delta switch in a multiphase motor each phase having one motor winding having a connection pair and contact device (CD), has an electromagnetic drive for drive axle movement between three axial positions, the CD having first and second motor winding connection contacts (MWCC), phase connection contact (PCC), and movable contact bridge (MCB) coupled to the drive axle and movable thereby into the three positions. In position-1, axially between positions-2/3, the MCB is open—no CC is connected to another CC by the MCB; in position-2, the MCB is in 'wye' contact position—the MCB connects the PCC to the first MWCC, and the second MWCC is connected to the second MWCC of all other CDs using the 'wye' coupled to the drive axle; and in position-3, the MCB is in a 'delta' contact position—the MCB connects the FCC to the first and second MWCC.

6 Claims, 4 Drawing Sheets

(51) Int. Cl.
*H02P 1/32* (2006.01)
*H01H 50/54* (2006.01)
*H01H 51/22* (2006.01)
*H02K 11/00* (2016.01)
*H01H 51/00* (2006.01)
*H01H 53/015* (2006.01)

(52) U.S. Cl.
CPC ............ *H02K 11/0094* (2013.01); *H02P 1/32* (2013.01); *H01H 51/005* (2013.01); *H01H 53/015* (2013.01); *H01H 2051/2218* (2013.01)

(58) Field of Classification Search
USPC ........................................................ 310/68 R
See application file for complete search history.

(56) References Cited

U.S. PATENT DOCUMENTS

| | | | | | |
|---|---|---|---|---|---|
| 5,068,587 | A | * | 11/1991 | Nakamura | H02P 25/18 318/771 |
| 5,142,213 | A | * | 8/1992 | Stelter | H02P 1/32 318/771 |
| 5,686,774 | A | * | 11/1997 | Slavik | H02K 3/28 310/198 |
| 6,025,693 | A | * | 2/2000 | Smith | H02P 1/265 318/768 |
| 6,794,967 | B1 | | 9/2004 | Park | |
| 6,847,185 | B2 | * | 1/2005 | Kume | H02P 25/188 318/732 |
| 6,894,455 | B2 | * | 5/2005 | Cai | F02N 11/04 318/771 |
| 8,598,836 | B1 | * | 12/2013 | Rabinovich | H02P 1/28 318/771 |
| 9,806,642 | B2 | * | 10/2017 | Bock | H01H 9/48 |
| 9,893,644 | B1 | * | 2/2018 | Ahladas | G01R 19/16547 |
| 2016/0131712 | A1 | * | 5/2016 | Bock | H01H 47/002 324/537 |
| 2016/0133411 | A1 | * | 5/2016 | Bock | H01H 47/002 361/187 |
| 2017/0032916 | A1 | * | 2/2017 | Schaar | H01H 50/546 |

FOREIGN PATENT DOCUMENTS

| | | |
|---|---|---|
| DE | 268569 A1 | 5/1989 |
| DE | 10084599 B4 | 11/2006 |
| WO | WO 0057444 A1 | 9/2000 |

* cited by examiner

SWITCHING DEVICE FOR A WYE-DELTA SWITCH IN A MULTIPHASE MOTOR

CROSS-REFERENCE TO RELATED APPLICATIONS

This application is a U.S. national stage application under 35 U.S.C. § 371 of International Application No. PCT/EP2015/054154, filed on Feb. 27, 2015, and claims benefit to German Patent Application No. DE 10 2014 105 579.9, filed on Apr. 17, 2014. The International Application was published in German on Oct. 22, 2015, as WO 2015/158457 A2 under PCT Article 21(2).

FIELD

The invention relates to a switching device for a star-delta changeover in a multiphase motor.

BACKGROUND

A star-delta changeover is employed, for example, in order to start up three-phase (electric) motors. For purposes of limiting the high start-up current, the three motor windings are interconnected during the start-up phase of the motor to form a star connection in which the three phases L1 to L3 are connected to the power supply of the motor via the connectors U1, V1 and W1 of the motor windings, and the connectors U2, V2 and W2 are interconnected. Owing to this interconnection, the total output of the motor during start-up is reduced to one-third of the operating output. During operation, the motor windings are interconnected to form a delta connection in which the connectors U1, W2 and V1, U2 and W1, V2 are interconnected and connected to the phase L1 or L2 or L3, respectively.

In order to implement such a star-delta changeover, three contactors Q11 (mains contactor), Q12 (delta contactor) and Q13 (star contactor) as shown in FIG. 1 are used. In this context, the contactors Q12 and Q13 effectuate the star-delta changeover. For purposes of the star connection, the contactor Q13 is closed and the contactor Q12 is opened. The opposite is done for the delta connection. In order to prevent short circuits between the phases L1, L2 and L3 caused by the simultaneous switching of the contactors Q12 and Q13 during the changeover, these contactors are blocked with respect to each other, which is ensured by means of auxiliary contacts.

East German patent application DD 268569 A1 discloses a switching device for a star-delta contactor in which three contact planes are provided so that the mains contactor, the delta contactor and the star contactor can be integrated together with a time relay in one module. The star-delta changeover takes place via a bimetal that releases a mechanical block and forces the contactor from the star operation to the delta operation when the contacts of the mains plane are closed. A bimetal, however, is not very precise, so that the point in time of the changeover from the star connection to the delta connection cannot be exactly determined. Moreover, this prior-art configuration makes use of many springs for generating the forces needed to hold the contacts in position or to put them in position. Since the elasticity of such springs can decline over the course of time, this can detrimentally affect the reliability of the switching device.

International patent application WO 00/57444 A1 likewise describes an integrated star-delta changeover having two contactor drives in the form of coils by means of which contacts that are held with springs and that can be moved by a lever can be moved between two positions in order to change over from star to delta connection. This lever construction, however, is laborious and likewise requires many springs that entail the above-mentioned drawbacks. Moreover, two contactor drives are needed.

SUMMARY

An aspect of the invention provides a switching device for a star-delta changeover in a multiphase motor including one motor winding per phase, each motor winding including a motor winding connector pair, the switching device comprising: an electromagnetic drive configured to move a drive shaft between first, second, and third defined axial positions; for each motor winding, a contact device including a first and a second motor winding connection contact, a phase connection contact, and a movable contact bridge, the movable contact bridge being coupled to the drive shaft and movable using the drive shaft into the three defined axial positions, wherein, when the movable contact bridge is in the first defined axial position, the first position arranged axially between the second and third defined axial positions, the movable contact bridge is in an open position in which none of the connection contacts is electrically connected to another one of the connection contacts via the movable contact bridge, wherein, when the movable contact bridge is in the second defined axial position, the movable contact bridge is in a star-contact position in which the movable contact bridge electrically connects the phase connection contact to the first motor winding connection contact, and the second motor winding connection contact is electrically connected to the second motor winding connection contacts of all other contact devices via a star contact coupled to the drive shaft, and wherein, when the movable contact bridge is in the third defined axial position, the movable contact bridge is in a delta-contact position in which the movable contact bridge electrically connects the phase connection contact to the first and second motor winding connection contacts.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
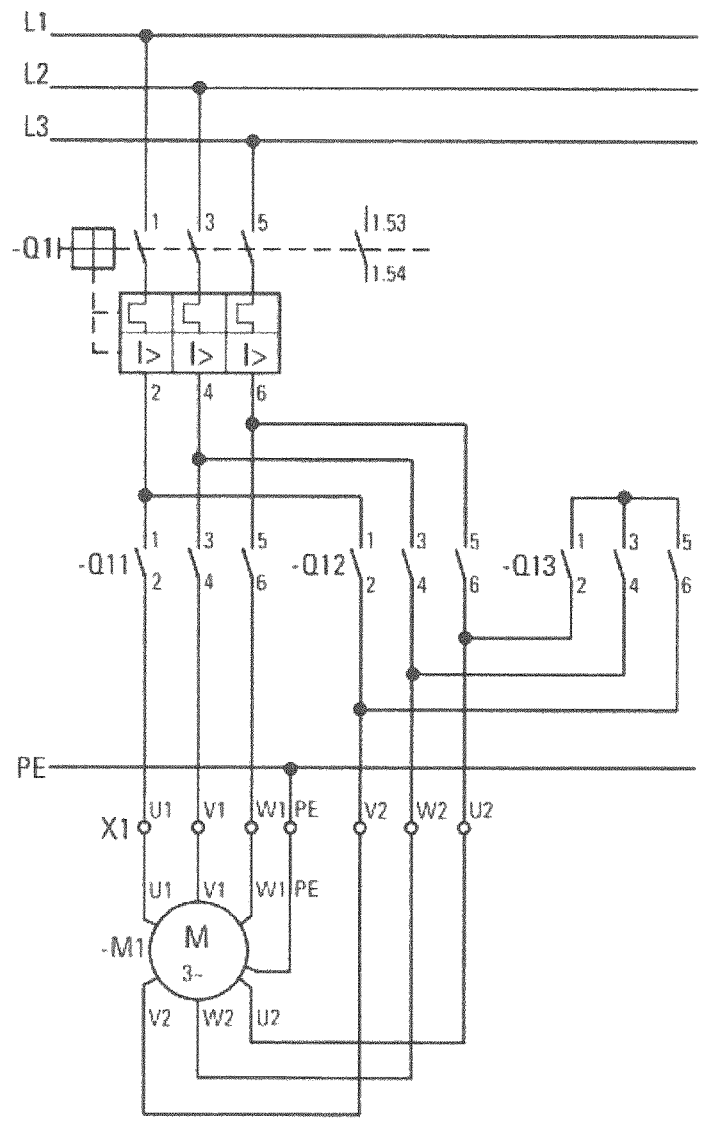
FIG. 1: a conventional star-delta changeover in a three-phase motor with three contactors.

Before this Background, an aspect of the present invention provides an improved switching device for a star-delta changeover in a multiphase motor.

An aspect of the present invention involves providing one contact device for each winding of a multiphase motor, said contact device being configured in such a way that it integrates the switching functions of the mains contactor, of the delta contactor and of the star contactor, and it has a contact bridge which is coupled to a drive shaft of an electromagnetic drive and which can be moved by means of the drive shaft between three defined axial positions. In this context, the contact device does not require any springs to generate the force or to hold the contact bridge since its placement or axial position can be controlled very precisely by means of the electromagnetic drive. Moreover, the process and timing of the changeover from the star connection to the delta connection and vice versa can be controlled exactly by means of the electromagnetic drive.

One embodiment of the invention relates to a switching device for a star-delta changeover in a multiphase motor having one motor winding per phase, whereby each motor winding has a motor winding connector pair U1, U2, V1, V2, W1, W2, and whereby the switching device comprises the following: an electromagnetic drive to move a drive shaft between three defined axial positions and, for each motor winding, a contact device with a first and a second motor winding connection contact, a phase connection contact, and a movable contact bridge that is coupled to the drive shaft and that can be moved by the latter into the three defined positions. When the movable contact bridge is in a first and axial position between the two other positions, it is then in an open position in which none of the connection contacts is electrically connected to another one of the connection contacts via the contact bridge. When the movable contact bridge is in a second position of the three defined positions, it is then in a star-contact position in which the contact bridge electrically connects the phase connection contact to the first motor winding connection contact, and the second motor winding connection contact is electrically connected to the second motor winding connection contacts of all other contact devices via a star contact coupled to the drive shaft. When the movable contact bridge is in a third position of the three defined positions, it is then in a delta-contact position in which the contact bridge electrically connects the phase connection contact to the first and second motor winding connection contacts.

In particular, the contact device can comprise the following: a conductive contact arm which starts from the first motor winding connection contact and leads to the plane of the star-contact position and which is contacted by the contact bridge in the star-contact position; a conductive contact arm which starts from the first motor winding connection contact and leads to the plane of the delta-contact position and which is contacted by the contact bridge in the delta-contact position; a conductive contact arm which starts from the phase connection contact and leads to the plane of the star-contact position and which is contacted by the contact bridge in the star-contact position; a conductive contact arm which starts from the phase connection contact and leads to the plane of the delta-contact position and which is contacted by the contact bridge in the delta-contact position; and a conductive contact arm which starts from the second motor winding connection contact and leads to the plane of the delta-contact position and which is contacted by the contact bridge in the delta-contact position as well as by the star contact in the star-contact position. The two conductive contact arms which start from the first motor winding connection contact as well as from the phase connection contact can form a U or V; other leg ends are each provided with contact points onto which corresponding contact points of the contact bridge are pressed in order to establish contact in the corresponding position of the contact bridge.

The electromagnetic drive can have a movable permanent magnet coupled to the drive shaft as well as a stationary electromagnet. In this context, when the stationary electromagnet is in its de-energized state, the movable permanent magnet can be held by springs in a first position so that the drive shaft is in the first defined position and, when the stationary electromagnet is in its energized state, the movable permanent magnet can be pressed, as a function of the current direction, into a second or third position, counter to the force of the springs, against a stop or against poles of the stationary electromagnet, so that the drive shaft is in the second or third defined position.

Alternatively, the electromagnetic drive can also have a movable electromagnet coupled to the drive shaft as well as a stationary electromagnet. In this context, when the movable or stationary electromagnet is in its de-energized state, the movable electromagnet can be held by springs in a first position so that the drive shaft is in the first defined position and, when both electromagnets are in their energized state, the movable electromagnet can be pressed, as a function of the current direction, into a second or third position, counter to the force of the springs, against a stop or against poles of the stationary electromagnet, so that the drive shaft is in the second or third defined position. The springs here can be provided in the form of electric feed lines that serve to energize the movable electromagnet.

The contact device can also have semiconductor switches that are installed between the movable contact bridge and the first and second motor winding connection contacts and the phase connection contact.

Additional advantages and application possibilities of the present invention ensue from the following description in conjunction with the embodiments shown in the drawings.

The description, the claims, the abstract and the drawings make use of the terms and appertaining reference numerals as cited in the list of reference numerals presented at the end.

Identical, functionally equivalent and functionally related elements can be provided with the same reference numerals in the description that follows. Absolute values are indicated below only by way of example and should not be construed as being of a limiting nature for the invention.

Figure 2:
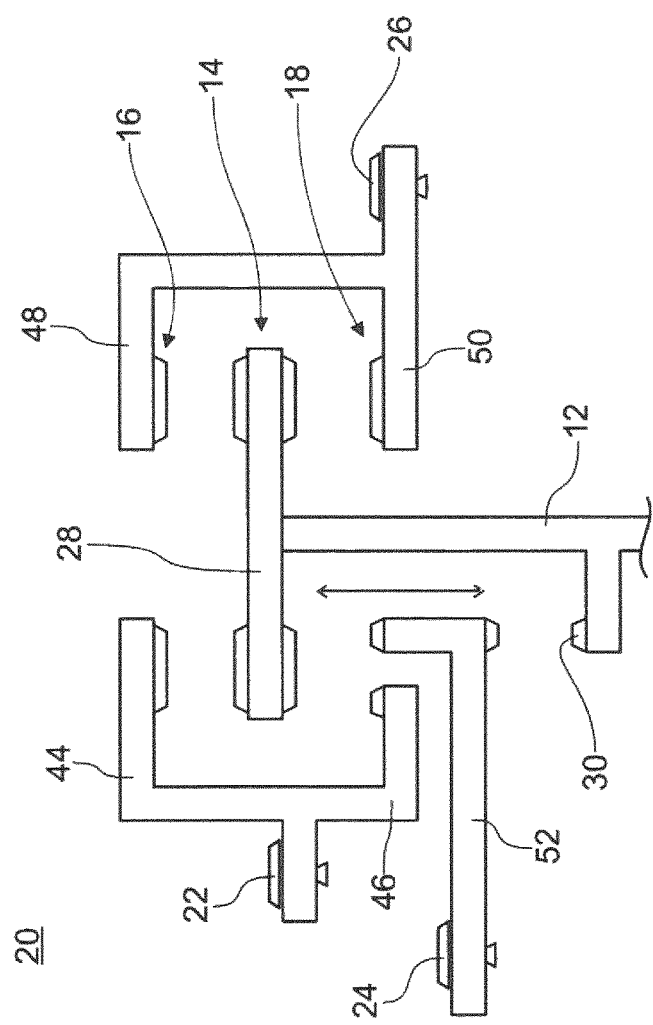
FIG. 2: a sectional view of an embodiment of a contact device of a switching device according to the invention.

The switching device for a star-delta changeover in a three-phase motor having one motor winding per phase according to the invention integrates the three contactors Q11, Q12 and Q13 of the conventional star-delta changeover shown in FIG. 1 by means of a special contact device 20, a sectional view of which is shown in FIG. 2. For this purpose, each motor winding is provided with its own contact device 20, so that a three-phase motor requires three of the contact devices 20 shown in FIG. 2.

The contact device 20 stands out especially for the fact that the axially (see the double-headed arrow in FIG. 2) movable contact bridge 28 can be moved into three defined and different positions: an open position or open placement 14 (middle position of the contact bridge as shown in FIG. 2), a star-contact position or star-contact placement 16, and a delta-contact position or delta-contact placement 18. The three positions or placements 14, 16, 18 correspond to three different planes.

The contact bridge 28 is moved axially between the three axial positions 14, 16 and 18 by means of a drive shaft 12 which is connected to the contact bridge 28 and which is made of a material that is not electrically conductive, especially an insulator. The movement is brought about by an electromagnetic drive. As shown in FIG. 2, the contact device 20 does not need any springs to hold the contact bridge 28 in its three positions 14, 16, 18.

The contact device 20 shown in FIG. 2 has a first motor winding connection contact 22, a second motor winding connection contact 24 and a phase connection contact 26. In the first of the three contact devices, the connection contact 22 is connected to U1, the connection contact 24 to V2 and the connection contact 26 to L1. In the second of the three contact devices, the connection contact 22 is connected to V1, the connection contact 24 to W2 and the connection contact 26 to L2. In the third of the three contact devices, the connection contact 22 is connected to W1, the connection contact 24 to U2 and the connection contact 26 to L3.

Two electrically conductive contact arms 44 and 46 lead from the connection contact 22 to the plane of the star-contact position 16 or to the delta-contact position 18. As shown in FIG. 2, the contact arms 44 and 46 have a somewhat U-shaped cross section. Analogously, two electrically conductive contact arms 48 and 50 lead from the connection contact 26 to the plane of the star-contact position 16 or to the delta-contact position 18 and, as shown in FIG. 2, they likewise have a somewhat U-shaped cross section. In the space enclosed by the contact arms 44, 46, 48 and 50, there is a contact bridge 28 which, in the star-contact position 16, is pressed against the contact arms 44 and 48 while, in the delta-contact position 18, it is pressed against the contact arms 46 and 50. Another electrically conductive contact arm 52 leads from the connection contact 24 out of the plane of the delta-contact position 18. As shown in FIG. 2, the end of this contact arm 52 is provided with a double contact, as a result of which, when the connection contact 24 is in the star-contact position 16, it is contacted by a star contact 30 that is attached to the drive axis 12 and, when it is in the delta-contact position 18, it is contacted by the contact bridge 28.

Therefore, if the contact bridge 28 is moved out of the open position 14 in which none of the connection contacts 22, 24 or 26 is connected to another contact into the star-contact position 16, then the connection contacts 22 and 26 are electrically connected to each other (that is to say, U1 and L1, V1 and L2, W1 and L3), and the connection contact 24 is electrically connected to the star contact 30 which is electrically connected to the star contacts of the other contact devices (that is to say, V2 to W2 and U2). In this manner, the star-contact position 16 corresponds to the closing of the contactors Q11 and Q13 in the circuit shown in FIG. 1.

In the delta-contact position 18, the contact bridge 28 short-circuits all three connection contacts 22, 24 and 26 (that is to say, U1 to L1 and V2, V1 to L2 and W2, W1 to L3 and U2). In this manner, the delta-contact position 18 corresponds to the closing of the contactors Q11 and Q13 of the circuit shown in FIG. 1.

Since the construction of the contact device 20 is such that the changeover from the star-contact position 16 to the delta-contact position 18 and vice versa always takes place via the open position 14, no short-circuits can occur between the phases L1, L2 and L3.

Figure 3:
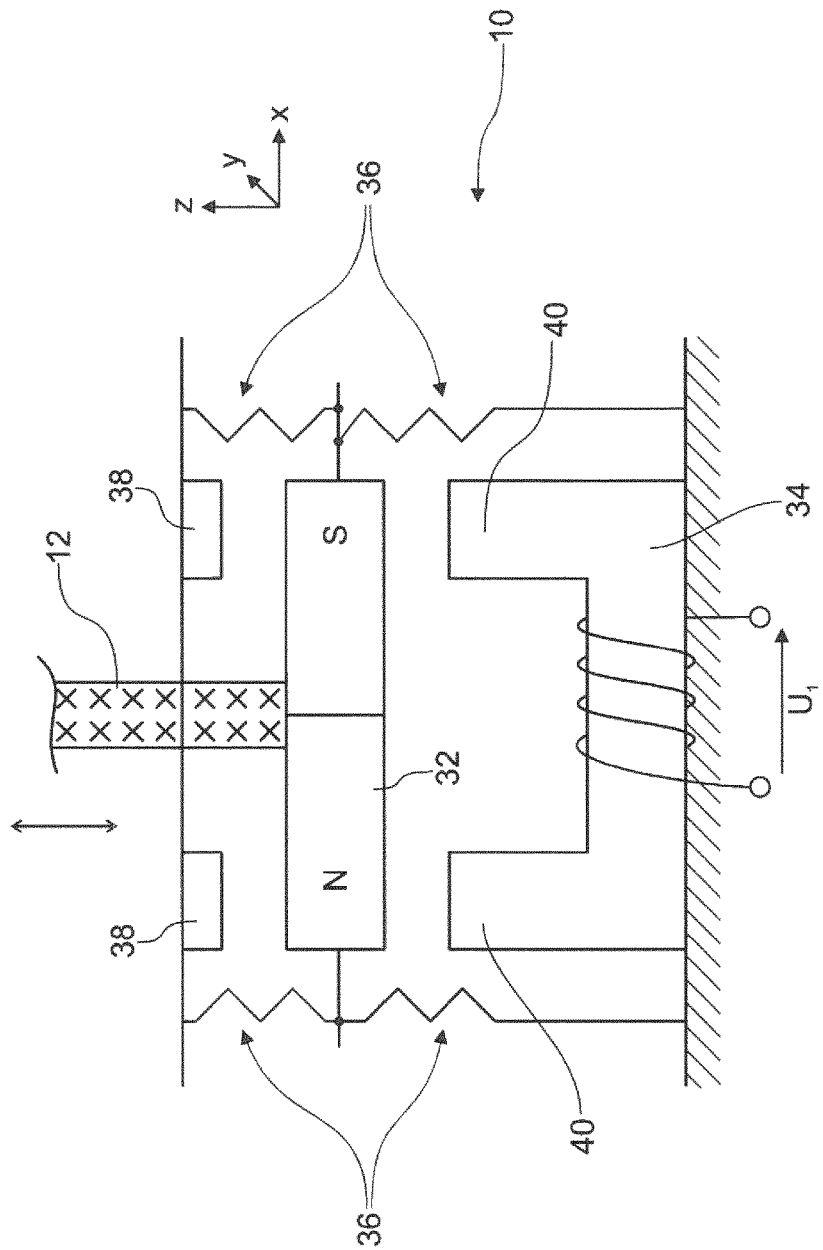
FIG. 3: a first embodiment of an electromagnetic drive with a movable permanent magnet of a switching device according to the invention.

FIG. 3 shows an electromagnetic drive 10 for the drive shaft 12 having a permanent magnet 32 which is movably mounted and attached to the drive shaft 12 and which is held by springs 36 in a first position between stops 38 and poles 40 of a stationary electromagnet 34, as long as the electromagnet 34 is de-energized and is not exerting any magnetic force onto the permanent magnet 32.

In the first position of the permanent magnet 32, the contact bridge 28 that is coupled to the drive shaft 12 is in the open position 14. When the stationary electromagnet 34 is appropriately energized (voltage U1 in FIG. 3), the permanent magnet 32 can be attracted or repelled by the electromagnet 34. In order to move the contact bridge 28 that is coupled to the drive shaft 12 into the star-contact position 16, the electromagnet 34 is energized in such a way that the permanent magnet 32 is repelled and pressed against the stops 38. In order to move the contact bridge 28 that is coupled to the drive shaft 12 into the delta-contact position 18, the electromagnet 34 is energized in such a way that the permanent magnet 32 is attracted and pressed against the poles 40.

Figure 4:
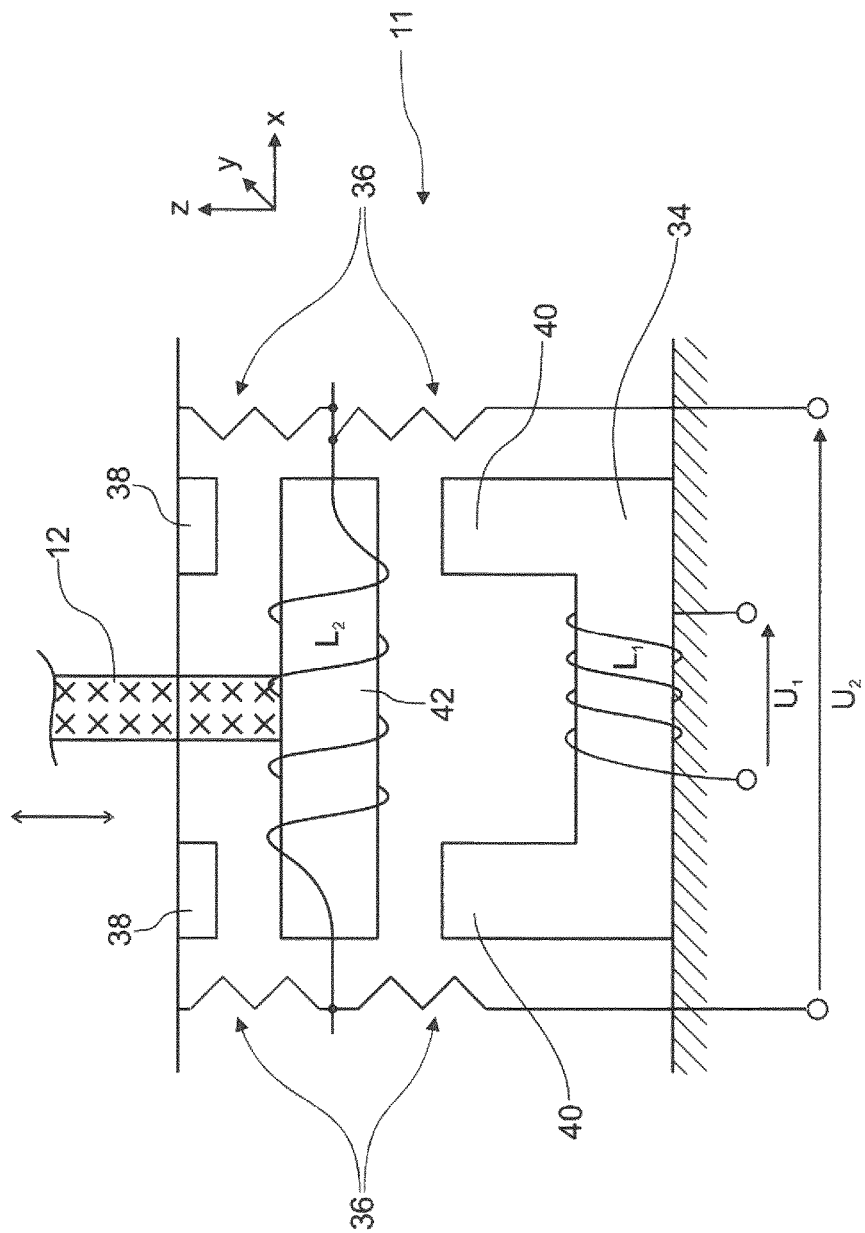
FIG. 4: a second embodiment of an electromagnetic drive with a movable electromagnet of a switching device according to the invention.

Instead of a permanent magnet 32, it is also possible to use a movable electromagnet 42, like the electromagnetic drive 11 shown in FIG. 4. In this context, the movable electromagnet 42 can be energized by means of the springs 36 (voltage U2 in FIG. 4) so that additional electric lines are not needed.

If the transitions between the individual positions 14, 16 and 18 are problematic in terms of arc formation, then semiconductor switches can be installed between the movable contact bridges and the connection contacts 22, 24 and 26 that are then switched through in order to prevent arc formation when the connection contacts 22, 24 and 26 are opened.

The switching device according to the invention could be actuated, for example, as follows: a time switch could prescribe a time after which the mode of operation is to be changed, for instance, changed over from a star connection to a delta connection. The changeover can also be carried out by a control unit that actuates the electromagnetic drive accordingly. Since there is no need to query any auxiliary switches as would be the case in the conventional star-delta changeover shown in FIG. 1, the programming resources needed to control the changeover can be considerably reduced by means of the invention. As another alternative, a prescribed electric voltage, for instance, with a ramp function, could be checked in order differentiate between the switching states.

The switching device according to the invention is especially well-suited for use in motor starters. The switching device according to the invention merely requires the connection of the motor and of the phases of the source of alternating current. The electromagnetic drive of the switching device according to the invention can be controlled as desired either by means of a programmable logic controller (PLC) or by simply applying an electric voltage. Owing to its high functional density, the switching device according to the invention permits a compact design. Finally, the switching device according to the invention makes it possible to reduce the amount of material needed for its production since it requires only one electromagnetic drive, only one electronic unit for actuation, no pre-wiring of several contactors during production and only one housing.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

LIST OF REFERENCE NUMERALS 10 electromagnetic drive with permanent magnets
11 electromagnetic drive with electromagnets
12 drive shaft made of non-conductive material
14 open position
16 star-contact position
18 delta-contact position
20 contact device
22 first motor winding connection contact
24 second motor winding connection contact
26 phase connection contact
28 movable contact bridge
30 star contact
32 movable permanent magnet
34 stationary electromagnet
36 springs
38 stop
40 poles of the stationary electromagnet
42 movable electromagnet
44 conductive contact arm
46 conductive contact arm
48 conductive contact arm
50 conductive contact arm
52 conductive contact arm

The invention claimed is:

1. A switching device for a star-delta changeover in a multiphase motor including one motor winding per phase, each motor winding including a motor winding connector pair, the switching device comprising:
    an electromagnetic drive configured to move a drive shaft between first, second, and third defined axial positions;
    for each motor winding, a contact device including a first and a second motor winding connection contact, a phase connection contact, and a movable contact bridge, the movable contact bridge being coupled to the drive shaft and movable using the drive shaft into the three defined axial positions,
    wherein, when the movable contact bridge is in the first defined axial position, the first position arranged axially between the second and third defined axial positions, the movable contact bridge is in an open position in which none of the connection contacts is electrically connected to another one of the connection contacts via the movable contact bridge,
    wherein, when the movable contact bridge is in the second defined axial position, the movable contact bridge is in a star-contact position in which the movable contact bridge electrically connects the phase connection contact to the first motor winding connection contact, and the second motor winding connection contact is electrically connected to the second motor winding connection contacts of all other contact devices via a star contact coupled to the drive shaft, and
    wherein, when the movable contact bridge is in the third defined axial position, the movable contact bridge is in a delta-contact position in which the movable contact bridge electrically connects the phase connection contact to the first and second motor winding connection contacts.

2. The switching device of claim 1, wherein the contact device includes:
    a first conductive contact arm configured to start from the first motor winding connection contact and configured to lead to a plane of the second defined axial position, which is a star-contact position, the first conductive contact arm being contacted by the movable contact bridge in the star-contact position;
    a second conductive contact arm configured to start from the first motor winding connection contact and configured to lead to a plane of the third defined axial position, which is a delta-contact position, the second conductive contact arm being contacted by the movable contact bridge in the delta-contact position;
    a third conductive contact arm configured to start from the phase connection contact and configured to lead to the plane of the star-contact position, the third conductive contact arm being contacted by the movable contact bridge in the star-contact position;
    a fourth conductive contact arm configured to start from the phase connection contact and configured to lead to the plane of the delta-contact position, the fourth conductive contact arm being contacted by the movable contact bridge in the delta-contact position; and
    a fifth conductive contact arm configured to start from the second motor winding connection contact and configured to lead to the plane of the delta-contact position, the fifth conductive contact arm being contacted by the movable contact bridge in the delta-contact position as well as by the star contact in the star-contact position.

3. The switching device of claim 1, wherein the electromagnetic drive includes a movable permanent magnet coupled to the drive shaft, and a stationary electromagnet,
    wherein, when the stationary electromagnet is in its de-energized state, the movable permanent magnet is held by springs in a first position such that the drive shaft is in the first defined axial position, and
    wherein, when the stationary electromagnet is in its energized state, the movable permanent magnet is pressed, as a function of current direction, into a second or third position, counter to a force of the springs, against a stop or against poles of the stationary electromagnet, such that the drive shaft is in the second or third defined axial position.

4. The switching device of claim 1, wherein the electromagnetic drive includes a movable electromagnet, coupled to the drive shaft, and a stationary electromagnet,
    wherein, when the movable or stationary electromagnet is in its de-energized state, the movable electromagnet is held by springs in a first position such that the drive shaft is in the first defined axial position, and
    wherein, when both electromagnets are in their energized state, the movable electromagnet is pressed, as a function of current direction, into a second or third position, counter to a force of the springs, against a stop or against poles of the stationary electromagnet, such that the drive shaft is in the second or third defined axial position.

5. The switching device of claim 4, wherein the springs are in the form of electric feed lines configured to energize the movable electromagnet.

6. The switching device of claim 1, wherein the contact device includes semiconductor switches installed between the movable contact bridge and the first and second motor winding connection contacts and the phase connection contact.

\* \* \* \* \*